United States Patent
Thomas et al.

(10) Patent No.: US 8,167,179 B2
(45) Date of Patent: May 1, 2012

(54) RETRACTABLE CROSSBOW ROOF RACK

(75) Inventors: Richmond P. Thomas, Clarkston, MI (US); Brett Ladetto, Clarkston, MI (US); Jacek Dubiel, Rochester, MI (US); Daniel T. Griffin, Waterford, MI (US); Carl Mather, Lake Orion, MI (US); David E. Dawkins, Rochester Hills, MI (US); Paresh Rana, Clawson, MI (US); George Konstantakopoulos, Birmingham, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1050 days.

(21) Appl. No.: 11/741,204

(22) Filed: Apr. 27, 2007

(65) Prior Publication Data

US 2008/0264988 A1 Oct. 30, 2008

(51) Int. Cl.
*B60R 9/00* (2006.01)
*B60R 9/042* (2006.01)

(52) U.S. Cl. .......... 224/321; 224/315; 224/325

(58) Field of Classification Search .......... 224/321, 224/325, 310, 314, 315, 317, 319, 320, 322, 224/326, 327; 296/37.7; 280/769
See application file for complete search history.

(56) References Cited

U.S. PATENT DOCUMENTS

| | | | |
|---|---|---|---|
| 3,542,264 A * | 11/1970 | Meyer et al. ............. 224/42.34 |
| 4,416,406 A * | 11/1983 | Popeney ............... 224/314 |
| 5,096,106 A * | 3/1992 | Foster et al. .............. 224/321 |
| 5,253,792 A * | 10/1993 | Foster et al. .............. 224/321 |
| 5,303,858 A * | 4/1994 | Price ................. 224/405 |
| 5,474,217 A * | 12/1995 | Mandarino et al. .......... 224/321 |
| 5,511,709 A * | 4/1996 | Fisch ................. 224/321 |
| 5,765,737 A * | 6/1998 | Cucheran et al. ............ 224/326 |
| 6,029,873 A * | 2/2000 | Won et al. ............... 224/321 |
| 6,260,751 B1 * | 7/2001 | Heiler ................ 224/321 |
| 6,729,513 B2 * | 5/2004 | Kmita et al. ............. 224/320 |
| 6,769,728 B2 * | 8/2004 | Albaisa et al. ............ 296/37.7 |
| 6,779,696 B2 * | 8/2004 | Aftanas et al. ............ 224/315 |
| 6,796,471 B2 * | 9/2004 | Aftanas et al. ............ 224/321 |
| 7,198,184 B2 * | 4/2007 | Aftanas et al. ............ 224/309 |
| 7,422,130 B2 * | 9/2008 | Shaukat ............... 224/316 |
| 2004/0195866 A1 * | 10/2004 | Fin ................... 296/210 |
| 2007/0075108 A1 * | 4/2007 | Stapleton ............... 224/321 |
| 2008/0272624 A1 * | 11/2008 | Donicke ............... 296/216.01 |
| 2008/0290123 A1 * | 11/2008 | Sprague ............... 224/321 |

FOREIGN PATENT DOCUMENTS

| | | |
|---|---|---|
| DE | 3719974 A1 * | 12/1987 |
| DE | 3826662 A1 * | 2/1990 |
| DE | 4018009 A1 * | 12/1991 |
| DE | 19954835 A1 * | 5/2001 |
| FR | 2862584 A1 * | 5/2005 |

* cited by examiner

*Primary Examiner* — Justin Larson
*Assistant Examiner* — Lester L Vanterpool
(74) *Attorney, Agent, or Firm* — Ralph E. Smith

(57) ABSTRACT

A roof-rack assembly for a vehicle includes a roof having a first support member extending along a length thereof. A second support member is spaced apart from the first support member and extends along a length of the roof. At least one cross-member extends between and is attached to the first support member and the second support member and is movable between a use position and a stowed position relative to the roof. The at least one cross-member extends away from a surface of the roof in the use position and is received generally within the roof in the stowed position.

18 Claims, 10 Drawing Sheets

… (US 8,167,179 B2)

RETRACTABLE CROSSBOW ROOF RACK

FIELD OF THE INVENTION

The present invention relates to roof racks and, more particularly, to an adjustable roof-rack assembly.

BACKGROUND OF THE INVENTION

Conventional vehicles often include a roof-rack assembly mounted to a roof of the vehicle to support large and/or bulky items. For example, a vehicle may include a pair of rails extending along a length of a vehicle roof with at least one cross-member extending between each of the rails and spaced apart from a surface of the vehicle roof. The cross-members extending between the cross rails cooperate with the cross rails to support large and/or bulky items away from a top surface of the vehicle roof during transport of such items. Such supports and cross-members are typically fixedly attached to the vehicle and are not movable relative to the roof.

While conventional roof-rack assemblies adequately support large and/or bulky items on a roof of a vehicle, such roof-rack assemblies are typically not adjustable. Furthermore, because such roof-rack assemblies include supports that extend generally along a length of a vehicle roof and cross-members that extend between the supports and above a top surface of a vehicle roof, conventional roof-rack assemblies increase the overall drag of the vehicle. Increasing the drag of the vehicle generally reduces the fuel economy and performance of the vehicle. Further yet, because such conventional roof-rack systems are fixed in a position having side supports and cross-members that extend from a top surface of a vehicle roof, conventional roof-rack systems adversely affect the overall aesthetics and styling of the vehicle.

SUMMARY OF THE INVENTION

A roof-rack assembly for a vehicle includes a roof having a first support member extending along a length thereof. A second support member is spaced apart from the first support member and extends along a length of the roof. At least one cross-member extends between and is attached to the first support member and the second support member and is movable between a use position and a stowed position relative to the roof. The at least one cross-member extends away from a surface of the roof in the use position and is received generally within the roof in the stowed position.

A vehicle includes a roof having an outer surface and at least one channel recessed from the outer surface. A first support member extends along a length of the roof and a second support member extends along a length of the roof. At least one cross-member extends between and is attached to the first support member and the second support member and is movable relative to the roof between a stowed position and a use position. The at least one cross-member further extends from the outer surface of the roof in the use position and is recessed from the outer surface of the roof in the stowed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
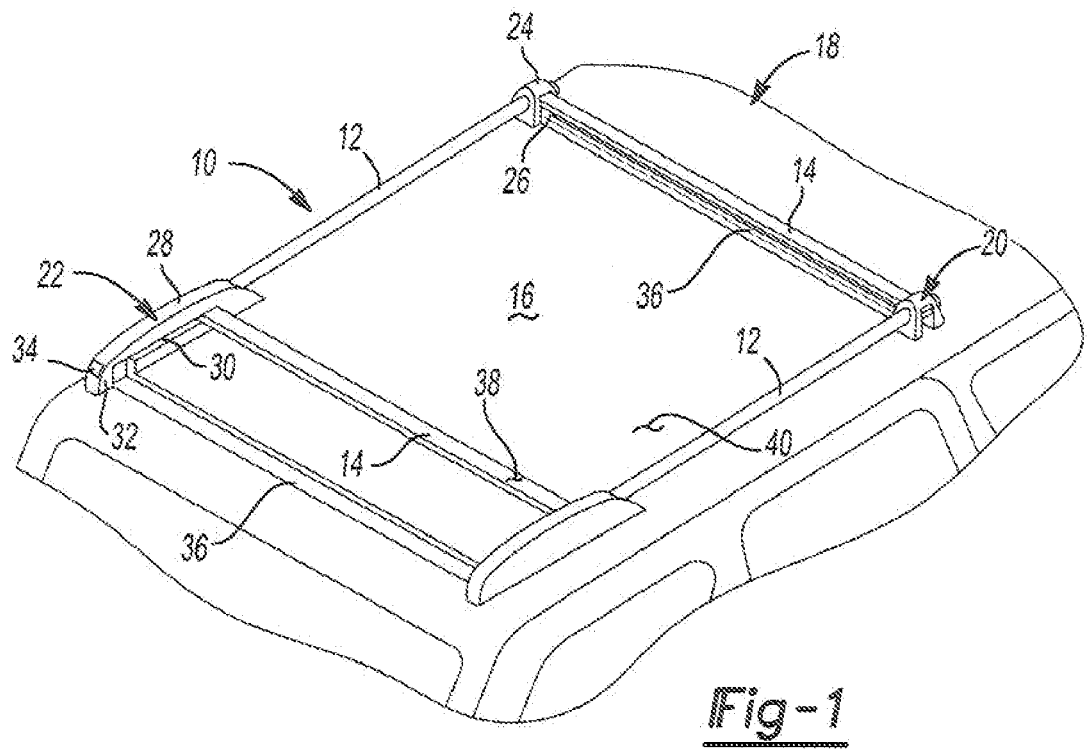
FIG. 1 is a partial perspective view of a vehicle incorporating a roof-rack assembly in accordance with the principles of the present invention.
Figure 2:
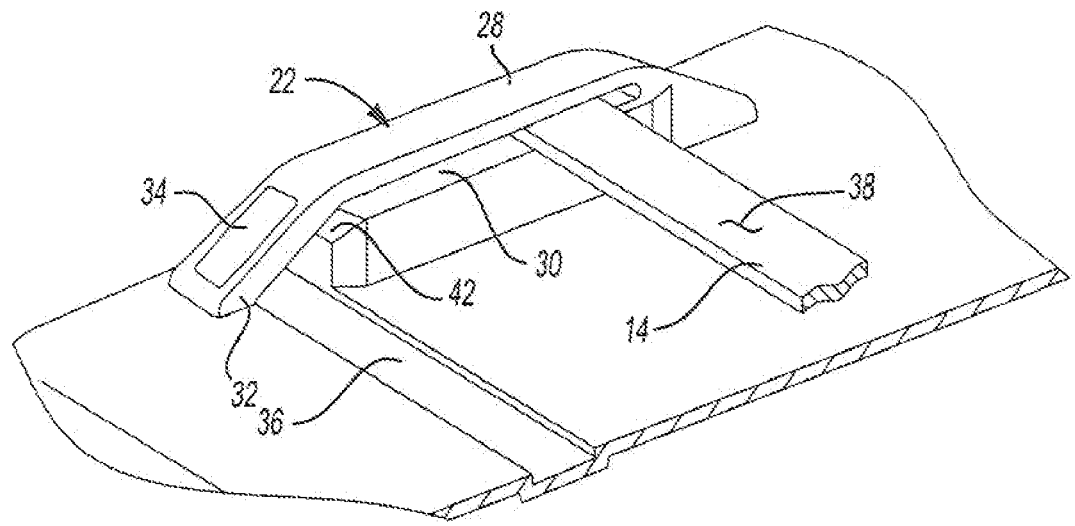
FIG. 2 is a partial perspective view of a rear portion of the roof-rack assembly of FIG. 1 with a cross-member in a use position.
Figure 3:
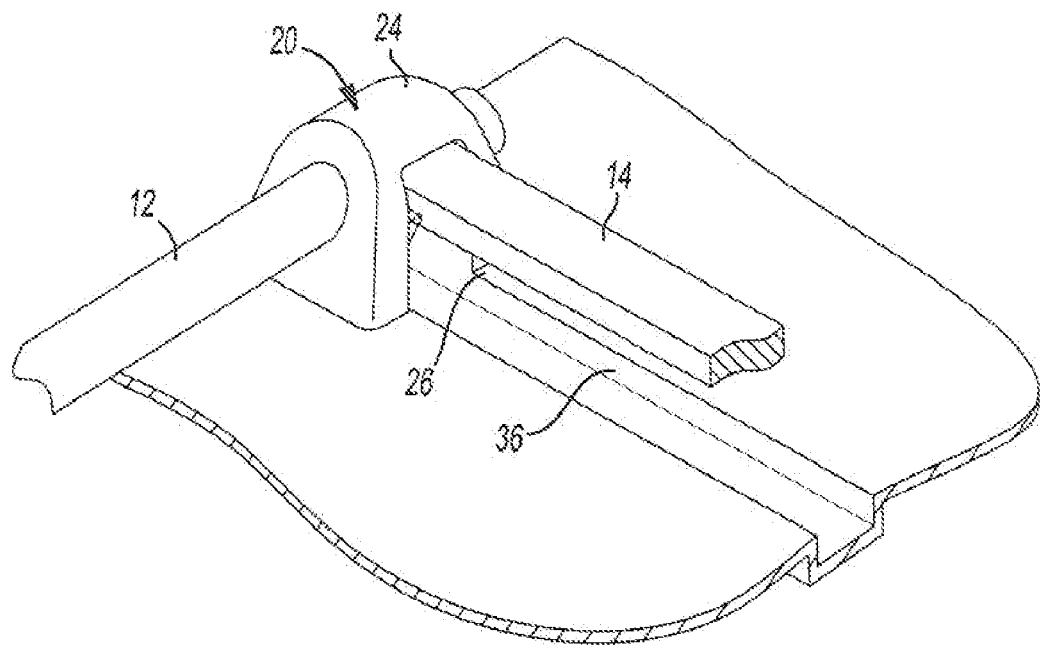
FIG. 3 is a partial perspective view of the roof-rack assembly of FIG. 1 with a cross-member in a use position.
Figure 4:
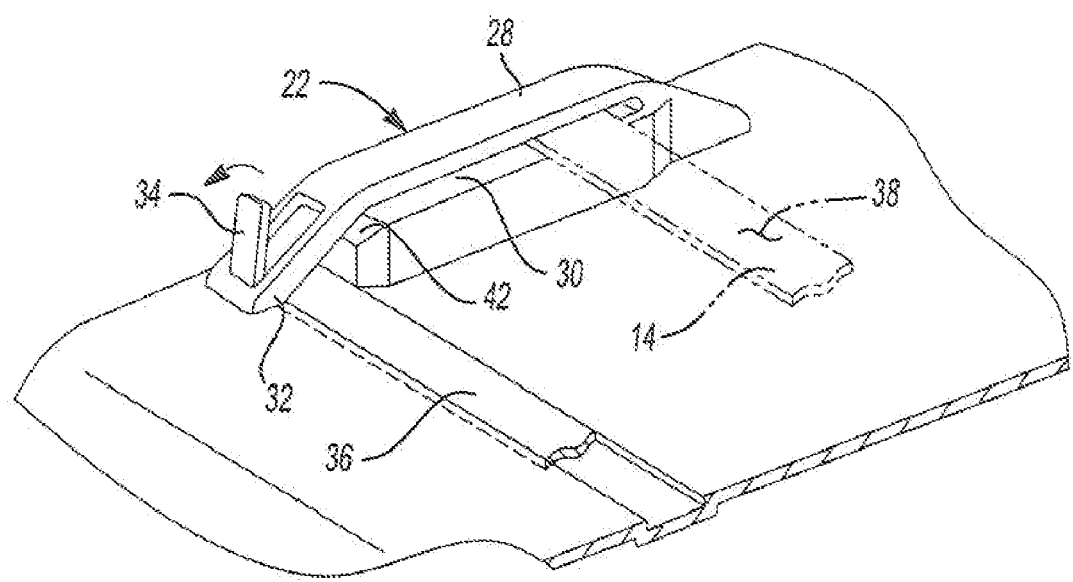
FIG. 4 is a partial perspective view of a rear portion of the roof-rack assembly of FIG. 1 with a cross-member in a stowed position.

The following description of the preferred embodiment(s) is merely exemplary in nature and is in no way intended to limit the invention, its application, or uses.

With reference to the figures, a roof-rack assembly 10 is provided and includes a pair of support members 12 and at least one cross-member 14 supported by and extending between the pair of support members 12. The roof-rack assembly 10 will be described hereinafter and shown in the drawings as being associated with a roof 16 of a vehicle 18. The support members 12 are supported by the roof 16 of the vehicle 18 and are fixedly attached thereto, while the at least one cross-member 14 is supported by the pair of support members 12 relative to the roof 16 of the vehicle 18 and may be moved between a use position and a stowed position.

The support members 12 are positioned on and fixedly attached to the roof 16 of the vehicle 18 and extend generally along a length of the roof 16. Each support member 12 may include a front assembly 20 disposed proximate to a junction of the roof 16 and a vehicle windshield (not shown) and a rear assembly 22 disposed proximate to a junction of the roof 16 and a rear panel (not shown) of the vehicle 18.

The front assembly 20 may include a cross-member 14 fixed to the roof 16 of the vehicle 18. Alternatively, each support member 12 may include a housing 24 that permits selective movement of the cross-member 14 between a use position and a stowed position. If each support member 12 of the front assembly 20 includes a housing 24 that permits movement of the cross-member 14 between a use position and a stowed position, the housing 24 may include a track 26 extending generally perpendicular to the roof 16 of the vehicle 18. The track 26 may facilitate movement of each end of the cross-member 14 relative to the housing 24 when the cross-member 14 is moved between the use position and a stowed position.

The rear assembly 22 may similarly include a housing 28 respectively associated with each support member 12 that fixedly attaches the cross-member 14 to the roof 16 of the vehicle 18. While the housing 28 of the rear assembly 22 may fixedly attach the cross-member 14 to the roof 16 of the vehicle, each housing 28 of the rear assembly 22 may include a track 30 that permits movement of the cross-member 14 between a use position and a stowed position. Furthermore, while the housing 28 of the rear assembly 22 may include a track 30 that permits movement of the cross-member 14 between a use position and a stowed position, the track 30 of the housing 28 may be formed to permit fore and aft movement of the cross-member 14 when the cross-member 14 is in the use position. Further yet, the track 30 may include a shape that permits movement of the cross-member 14 from the stowed position to the use position while concurrently allowing the cross-member 14 to be moved in a fore-aft direction relative to the vehicle 18.

At least one of the housings 28 of the rear assembly 22 may include a lock mechanism 32 that selectively prevents movement of the cross-member 14 relative to each housing 28 of the rear assembly 22. The lock mechanism 32 may include an actuation handle 34 that permits a user to toggle the lock mechanism 32 between a locked state and an unlocked state. When the locking mechanism 32 is in the locked state, the cross-member 14 is restricted from moving relative to the housings 28 of the support members 12 from the stowed position to the use position. Conversely, when the lock mechanism 32 is in the unlocked state, the cross-member 14 may be moved from the stowed position to the use position by sliding the cross-member 14 within the track 30 of the housings 28.

The cross-member 14 is a generally rigid member that extends between the pair of support members 12. If the roof-rack assembly 10 includes multiple cross-members 14, one cross-member 14 may be associated with the front assembly 20 and another cross-member 14 may be associated with the rear assembly 22. Either cross-member 14 may be movable relative to the roof 16 between a use position and a stowed position. For example, the front assembly 20 may include a fixed cross-member 14 while the rear assembly 22 includes an adjustable cross-member 14.

While a single cross-member 14 is described as being associated with the front assembly 20 and a single cross-member 14 is described as being associated with the rear assembly 22, at least one more cross-member 14 may be fixedly or slidably attached to the support members 12 generally between the front assembly 20 and the rear assembly 22.

The roof 16 of the vehicle 18 may include at least one recess 36 that receives the cross-member 14 when the cross-member 14 is in the stowed position. The recess 36 may be integrally formed with the roof 16 and may include a depth substantially equal to a thickness of the cross-member 14. Each recess 36 may also mimic the overall shape of the cross-member 14 (i.e., curvature, change in thickness, etc.). Providing the recess 36 with a depth substantially equal to a thickness of the cross-member 14 allows a top surface 38 of the cross-member 14 to be substantially flush with a surface 40 of the roof 16.

With particular reference to FIGS. 1-4, operation of the roof-rack assembly 10 will be described in detail. When the cross-member 14 associated with the front assembly 20 is in the stowed position and is disposed generally within the recess 36 of the roof 16, the top surface 38 of the cross-member 14 is substantially flush with the surface 40 of the roof 16. Applying a force to the cross-member 14 to move the cross-member 14 generally away from the roof 16 of the vehicle 18 causes each end of the cross-member 14 to move within the respective tracks 26 of the housings 24. Sufficient movement of the cross-member 14 away from the recess 36 and, thus, the roof 16, positions the cross-member 14 in the use position such that the cross-member 14 is spaced apart from the surface 40 of the roof 16. Once the cross-member 14 is sufficiently moved away from the roof 16 of the vehicle 18, the cross-member 14 is in the use position and may support cargo proximate to the surface 40 of the roof 16. The housings 24 may hold the cross-member 14 in the use position by way of a mechanical fastener and/or a releasable fastener such as, for example, a ball detent (not shown).

When the cross-member 14 associated with the rear assembly 22 is in the stowed position, the top surface 38 of the cross-member 14 is substantially flush with the surface 40 of the roof 16. To move the cross-member 14 from the stowed position to the use position, a force may be applied to the actuation handle 34 of the lock mechanism 32 to toggle the lock mechanism 32 from the locked state to the unlocked state. Movement of the lock mechanism 32 from the locked state to the unlocked state permits movement of each end of the cross-member 14 within the respective tracks 30 of the housings 28.

In one configuration, each track 30 includes a generally sloped portion 42 that allows the cross-member 14 to simultaneously move away from the surface 40 of the roof 16 and away from a rear portion of the vehicle 18. Such movement of the cross-member 14 within the tracks 30 of the housings 28 causes the cross-member 14 to move out of the recess 36 and generally towards the front assembly 20.

Sufficient movement of the cross-member 14 within the tracks 30 places the cross-member 14 in a spaced-apart relationship relative to the roof 16 of the vehicle 18 and positions the cross-member 14 in the use position. In this position, the cross-member 14 may support cargo relative to the vehicle roof 16 such that the cargo is spaced apart from the surface 40 of the roof 16. As with the front assembly 20, the rear assembly 22 may include a mechanical fastener and/or releasable fastener such as, for example, a ball detent, to hold the cross-member 14 in the use position.

A force may be applied to the cross-member 14 of the front assembly 20 to move the cross-member 14 relative to the respective housings 24 of the support members 12 to return the cross-member 14 to the stowed position. The force must be sufficient to overcome any locking mechanism (i.e., mechanical fastener and/or releasable fastener) holding the cross-member 14 in the use position to move the cross-member 14 from the use position to the stowed position. Sufficient movement of the cross-member 14 from the use position to the stowed position locates the cross-member 14 generally within the recess 36 formed in the roof 16 and causes the top surface 38 of the cross-member 14 to be substantially flush with the surface 40 of the roof 16. Positioning the top surface 38 of the cross-member 14 substantially flush with the surface 40 of the roof 16 provides the vehicle 18 with a generally streamlined roof 16 and, therefore, improves the overall aerodynamics and fuel economy of the vehicle 18.

Movement of the cross-member 14 associated with the rear assembly 22 may be similarly accomplished by applying a force to the cross-member 14 to move the cross-member 14 generally away from the front assembly 20 within the tracks 30. Sufficient movement of the cross-member 14 within the tracks 30 of the housings 28 causes the cross-member 14 to move down the sloped portion 42 of each track 30 and toward the recess 36 formed in the roof 16. Once the cross-member 14 has been moved sufficiently relative to each housing 28, the cross-member 14 is received generally within the recess 36 of the roof 16 such that the top surface 38 of the cross-member 14 is substantially flush with the surface 40 of the roof 16. As with the cross-member 14 of the front assembly 20, positioning the top surface 38 of the cross-member 14 such that the top surface 38 is substantially flush with the surface 40 of the roof 16 improves the aerodynamics and fuel efficiency of the vehicle 18.

Figure 5:
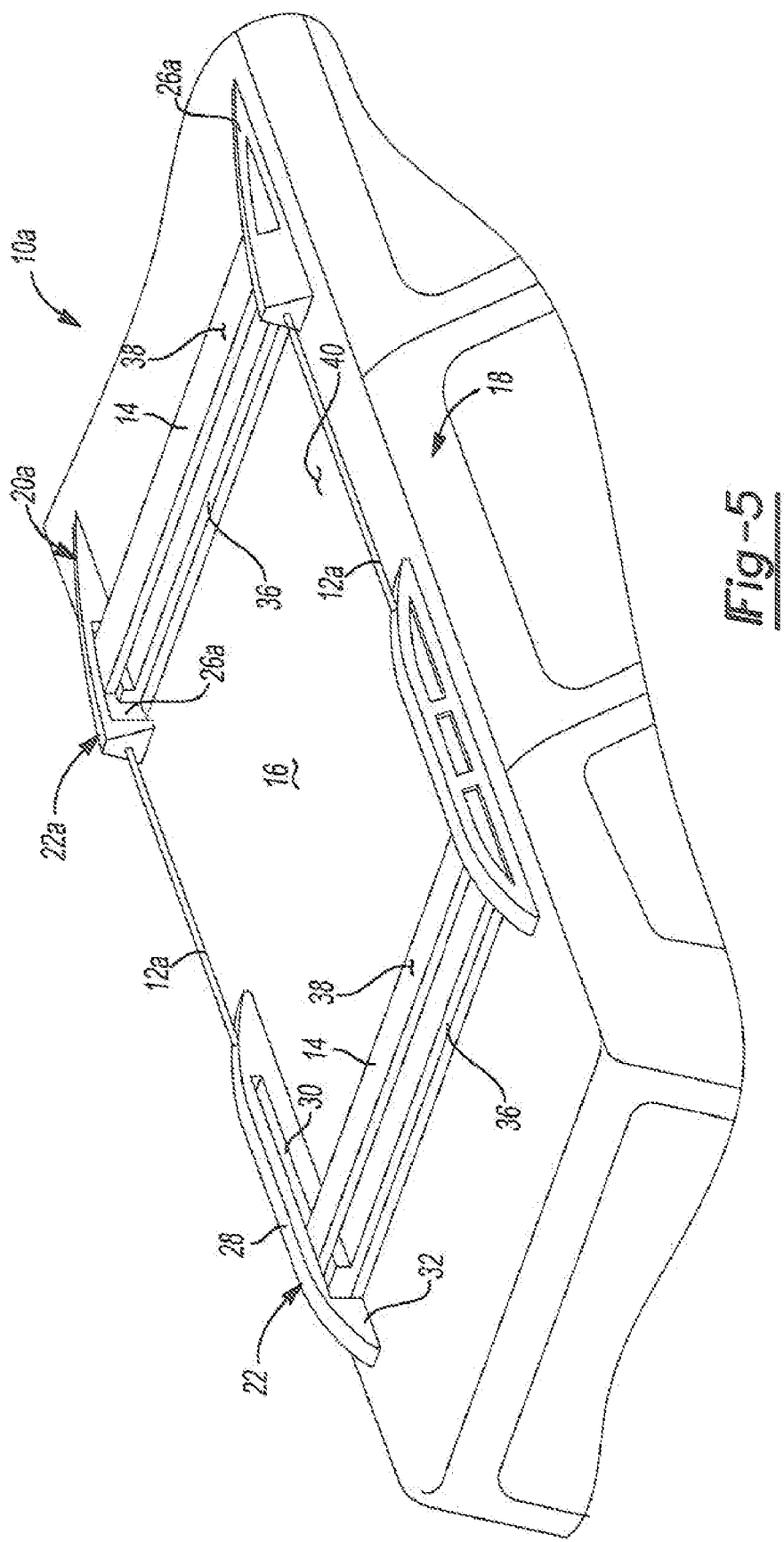
FIG. 5 is a partial perspective view of a vehicle incorporating a roof-rack assembly in accordance with the principles of the present invention.
Figure 6:
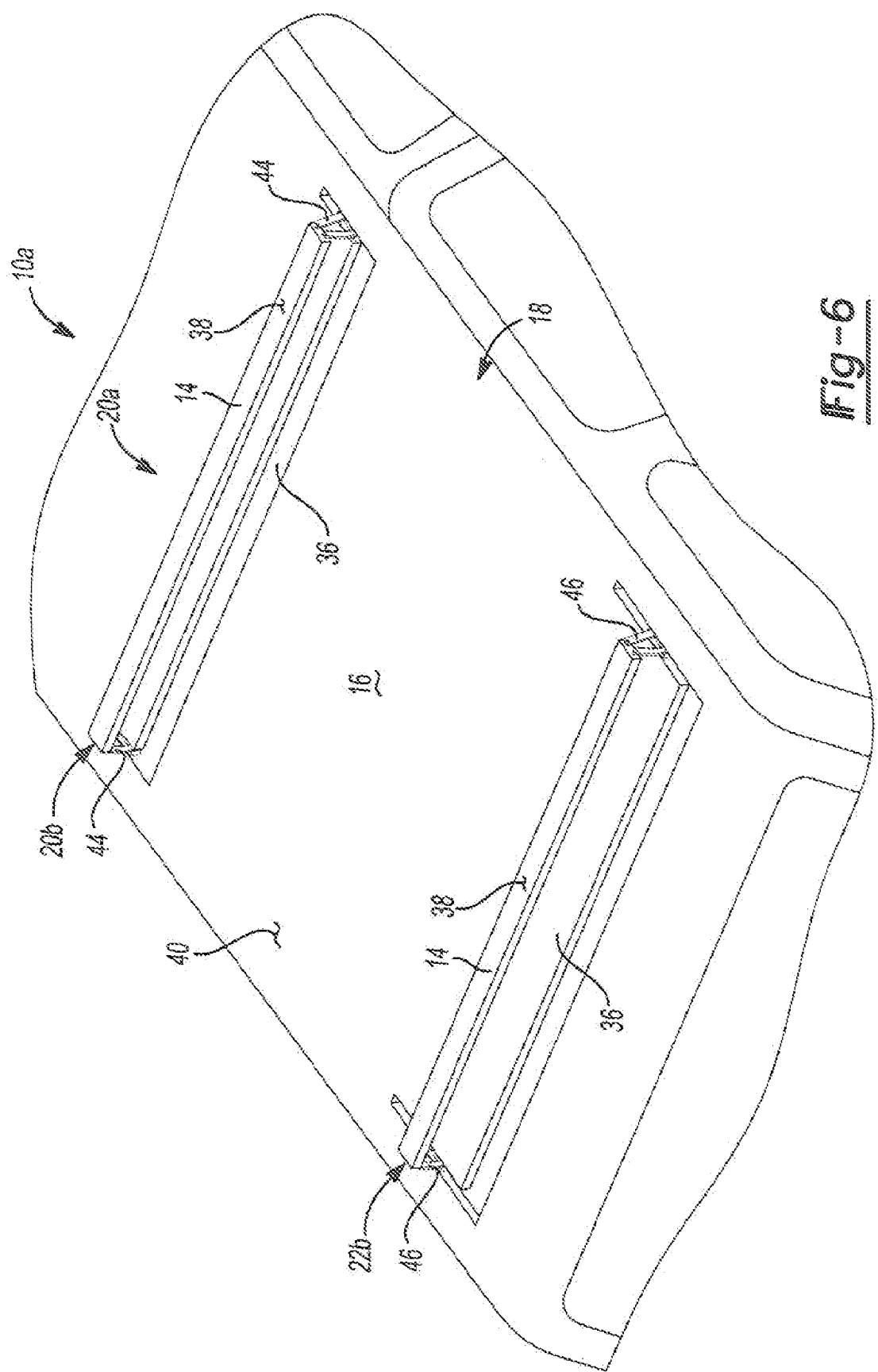
FIG. 6 is a partial perspective view of a vehicle incorporating a roof-rack assembly in accordance with the principles of the present invention.

With reference to FIG. 5, a roof-rack assembly 10a is provided and includes a pair of support members 12a and a pair of cross-member 14. In view of the substantial similarity in function and structure of the roof-rack assembly 10 with respect to the roof-rack assembly 10a, like reference numerals are used hereinafter in the drawings to identify like components while reference numerals containing letter extensions are used to identify those components that have been modified.

The front assembly 20a may include a pair of housings 24a each having a track 26a. The tracks 26a permit movement of the cross-member 14 between a stowed position and a use position relative to the roof 16 of the vehicle 18. As shown in FIG. 5, each track 26a formed in the respective housings 24a may include a generally L-shape such that the cross-member 14 must first be moved in a direction substantially perpendicular to the roof 16 of the vehicle 18 prior to being moved in a fore-aft direction.

The rear assembly 22 is substantially identical to the rear assembly 22 of the roof-rack assembly 10. Therefore, a detailed description of the components and operation of the rear assembly 22 is foregone.

With particular reference to FIG. 5, operation of the roof-rack assembly 10a will be described in detail. To move the cross-member 14 associated with the front assembly 20a from the stowed position to the use position, a force is applied generally to the cross-member 14 to move the cross-member 14 relative to the housings 28a. The initial force applied to the cross-member 14 moves the cross-member 14 in a direction substantially perpendicular to the roof 16 of the vehicle 18, generally within the tracks 26a. Sufficient movement of the cross-member 14 within the tracks 26a allows the cross-member 14 to be further moved within each track 26a such that the cross-member 14 is movable in a fore-aft direction relative to the roof 16 of the vehicle 18. Once the cross-member 14 has been moved sufficiently away from the roof 16 of the vehicle 18, a locking feature such as a mechanical fastener and/or releasable fastener holds the cross-member 14 in the use position. At this point, cargo may be positioned on the cross-member 14 and held in a spaced-apart relationship relative to the surface 40 of the roof 16 by the cross-member 14.

Moving the cross-member 14 from the use position to the stowed position requires application of a force to the cross-member 14 to initially move the cross-member 14 generally away from a front portion of the vehicle towards the rear assembly 22 within the tracks 26a. Sufficient movement of the cross-member 14 within the tracks 26a positions the cross-member 14 generally above the recess 36 and therefore allows the cross-member 14 to be moved generally perpendicular to the roof 16 and towards the recess 36. Movement of the cross-member 14 towards the roof 16 positions the cross-member 14 within the recess 36 such that the top surface 38 of the cross-member 14 is substantially flush with the surface 40. As with the roof-rack assembly 10, positioning the cross-member 14 in the stowed position when the cross-member 14 is not supporting cargo improves the overall aerodynamics and fuel economy of the vehicle 18.

With particular reference to FIGS. 6-9, a roof-rack assembly 10b is provided and includes a front assembly 20b and a rear assembly 22b. The front assembly 20a may include a linkage assembly 44 that permits movement of a cross-member 14 between a stowed position and a use position. Similarly, the rear assembly 22 may include a linkage assembly 46 that permits movement of a cross-member 14 from a stowed position to a use position.

Figure 7:
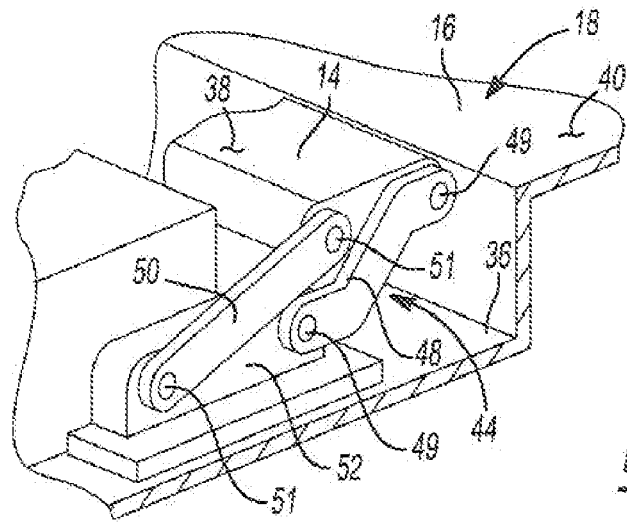
FIG. 7 is a partial perspective view of the roof-rack assembly of FIG. 6 with a cross-member in a stowed position.
Figure 8:
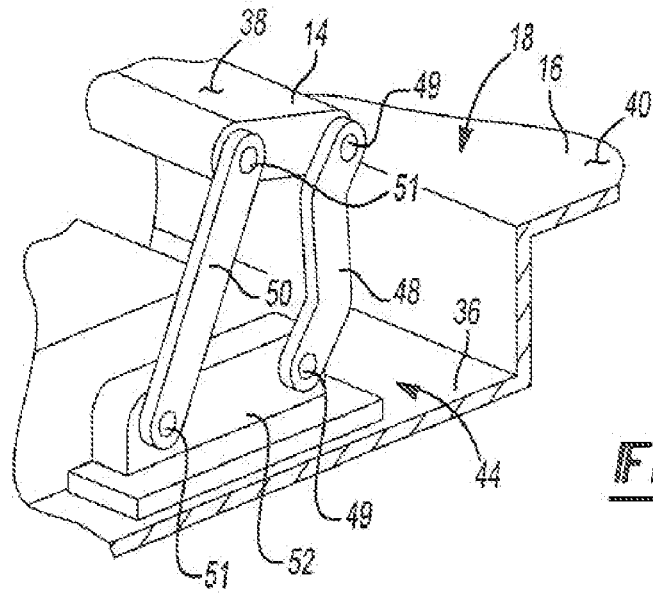
FIG. 8 is a partial perspective view of the roof-rack assembly of FIG. 6 with a cross-member in an intermediate position.
Figure 9:
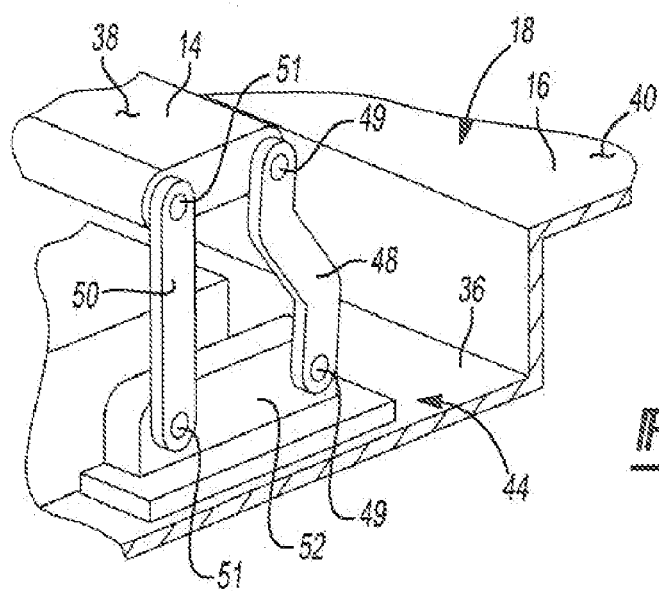
FIG. 9 is a partial perspective view of the roof-rack assembly of FIG. 6 with a cross-member in a use position.

Because the linkage assembly 44 is substantially identical to the linkage assembly 46, a detailed description of the components of the linkage assembly 46 and operation thereof is foregone. With particular reference to FIGS. 7-9, the linkage assembly 44 is shown to include a curved link 48 and a straight link 50 that cooperate to permit movement of the cross-member 14 between the stowed position and the use position. The curved link 48 may be pivotably attached to the cross-member 14 at a first end by a pin 49 and may be pivotably attached to a support bracket 52 at a second end by a pin 49. Similarly, the straight link 50 may be pivotably attached to the cross-member 14 by a pin 51 and may be pivotably attached to the support bracket 52 by a pin 51. Pivotably attaching the curved link 48 to the cross-member 14 and support bracket 52 and pivotably attaching the straight link 50 to the cross-member 14 and support bracket 52 creates a four-bar linkage that permits the cross-member 14 to be pivoted relative to the roof 16 of the vehicle 18 between the use position and the stowed position.

With continued reference to FIGS. 7-9, operation of the roof-rack assembly 10b will be described in detail. When the cross-member 14 is in the stowed position (FIG. 7), the top surface 38 of the cross-member 14 is substantially flush to the surface 40 of the roof 16. A force may be applied generally to the cross-member 14 to move the cross-member 14 relative to the roof 16 of the vehicle 18. The force applied to the cross-member 14 causes the links 48, 50 to pivot about pins 49, 51 disposed at respective ends of the curved link 48 and straight link 50. As the links 48, 50 pivot about pins 49, 51, respectively, the cross-member 14 moves out of the recess 36 formed in the roof 16 of the vehicle 18 and generally towards the use position. The cross-member 14 is shown in an intermediate position (i.e., between the stowed position and the use position) in FIG. 8.

Sufficient rotation of the links 48, 50 about pins 49, 51, respectively, causes the cross-member 14 to sufficiently move out of the recess 36 and into the use position such that the cross-member 14 is spaced apart from the surface 40 of the roof 16. In this position, a detent (not shown) may be associated with one or both of the links 48, 50 to hold the cross-member 14 in the use position.

A force may be applied to the cross-member 14 to overcome the hold force applied on the links 48, 50 to permit movement of the cross-member 14 from the use position towards the stowed position. Once the force of the detent is overcome, the cross-member 14 may be articulated relative to the roof 16 of the vehicle 18 such that the cross-member 14 approaches the recess 36 of the roof 16. Sufficient movement of the cross-member 14 relative to the roof 16 once again positions the cross-member 14 generally within the recess 36 such that the top surface 38 of the cross-member 14 is substantially flush with the surface 40 of the roof 16. As shown in FIG. 7, the overall shape of the curved line 48 allows the straight line 50 to nest therein and, as such, permits the cross-member 14 to be received within the recess 36 in the stowed position. As described above with respect to the roof-rack assembly 10, positioning the cross-member 14 such that a top surface 38 of the cross-member 14 is substantially flush with the surface 40 of the roof 16 improves the overall aerodynamics and fuel efficiency of the vehicle 18.

With particular reference to FIGS. 10-13, a roof-rack assembly 10c is provided and includes a front assembly 20c and a rear assembly 22c. In view of the substantial similarity in structure and function of the roof-rack assembly 10c with the roof-rack assembly 10, like reference numbers are used in the specification and drawings to describe the like components while like reference numerals containing letter extensions are used to describe those components that have been modified.

The front assembly 20c may include a linkage assembly 54 that permits movement of the cross-member 14 from the stowed position to the use position. Similarly, the rear assembly 22c may include a linkage assembly 56 that permits movement of the cross-member 14 from the stowed position to the use position. Because the linkage assembly 56 is substantially identical to the linkage assembly 54, a description of the components of the linkage assembly 54 and related operation thereof is foregone.

The linkage assembly 56 may include a top link 58 and a bottom link 60 that cooperate to selectively position the cross-member 14 between the use position and the stowed position. The top link 58 may be rotatably attached to an end of the cross-member 14 at a first end and may be rotatably attached to the bottom link 60 at a second end. The bottom link 60 may be rotatably attached to the top link 58 at a first end and may be rotatably attached to a support 62 at a second end. The support 62 may be fixedly attached to the roof 16 of the vehicle 18 to anchor the links 58, 60 and cross-member 14 to the vehicle 18.

Figure 10:
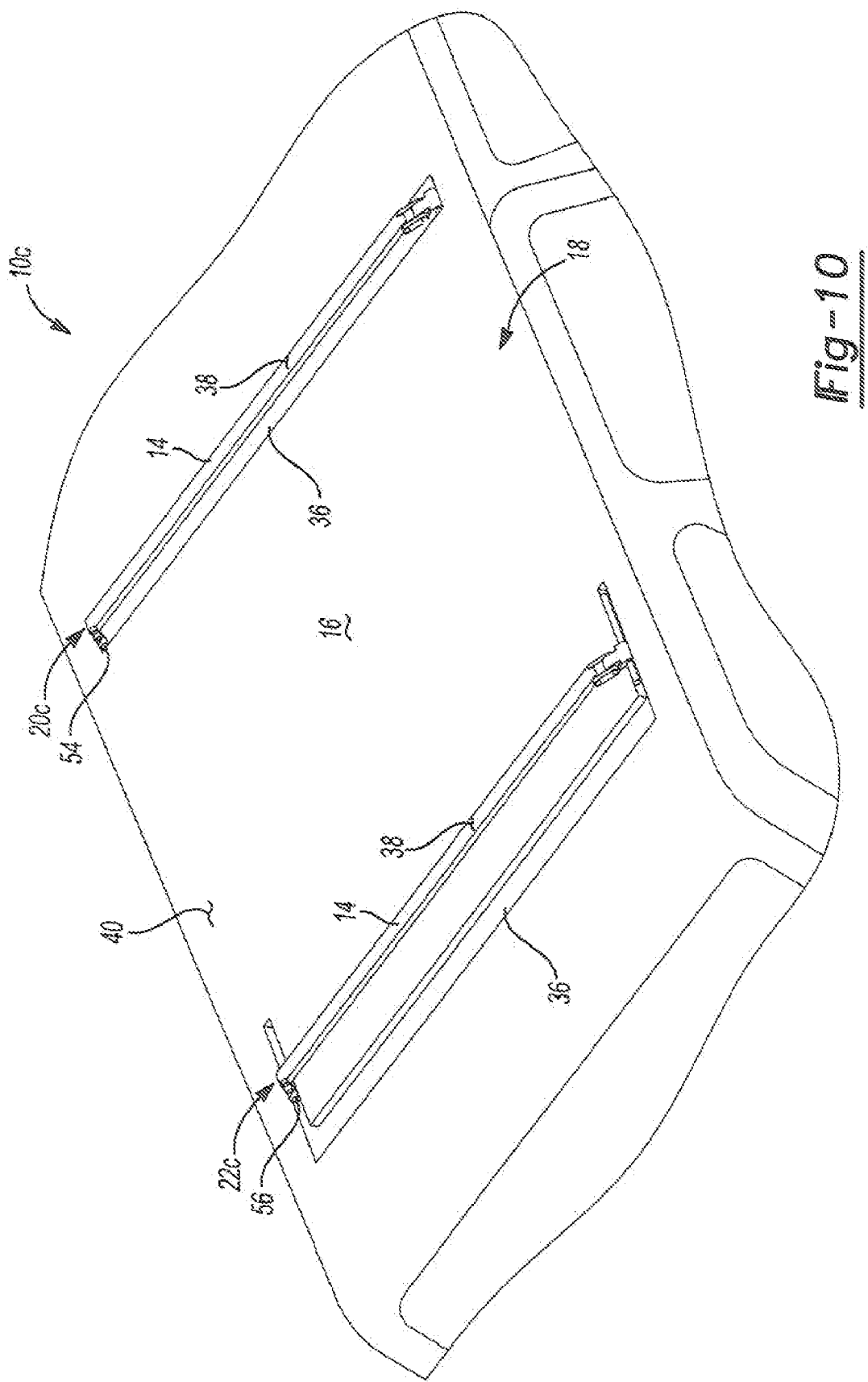
FIG. 10 is a partial perspective view of a vehicle incorporating a roof-rack assembly in accordance with the principles of the present invention.

The bottom link 60 may be attached to the support 62 such that the bottom link 60 is both rotatable and slidable relative to the support 62. In one configuration, the bottom link 60 includes a bore 64 that is matingly and slidingly received by a cylindrical portion 66 of the support 62. The bore 64 is slidably and rotatably attached to the cylindrical portion 66 such that the bottom link 60 is both rotatable and slidable relative to the roof 16 of the vehicle 18. While FIG. 10 shows the front assembly 20 as including a bottom link 60 that is only rotatably attached to the support 62, the support 62 of the front assembly 20c could alternatively include a length that is greater than a width of the bottom link 60 such that the bottom link 60 may be both rotatably and slidably attached to the support 62 in a similar fashion to that of the rear assembly 22c.

Figure 11:
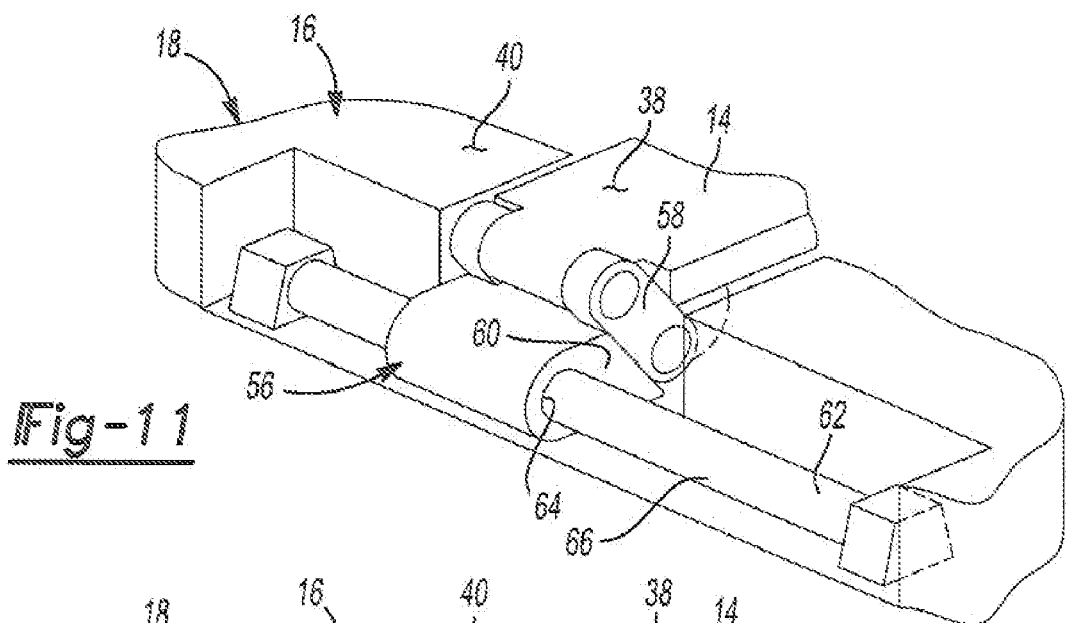
FIG. 11 is a partial perspective view of the roof-rack assembly of FIG. 10 with a cross-member in a stowed position.
Figure 12:
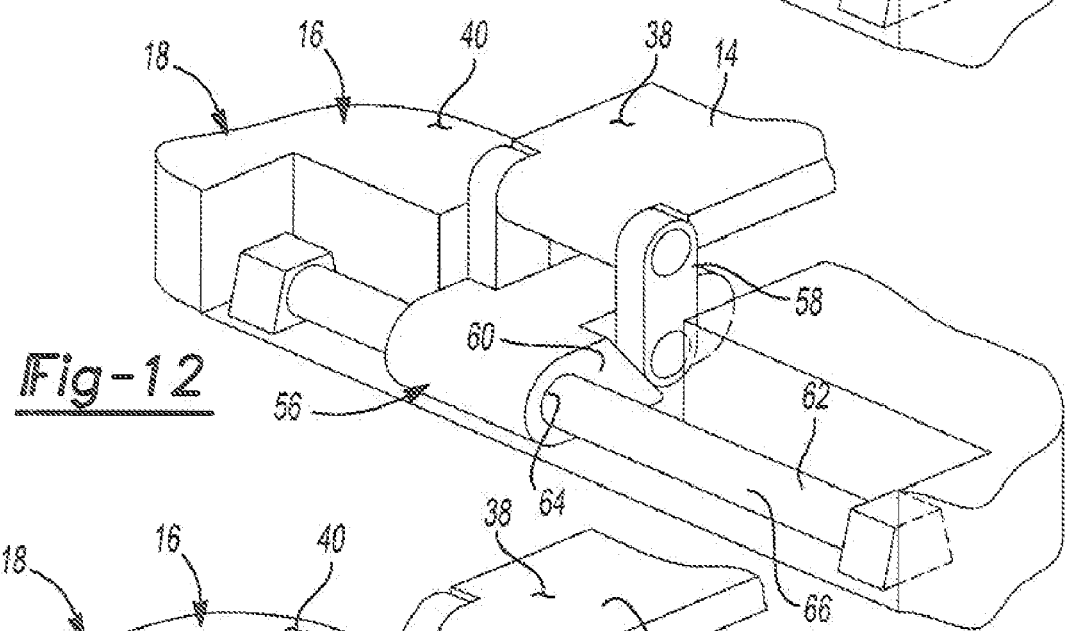
FIG. 12 is a partial perspective view of the roof-rack assembly of FIG. 10 with a cross-member in an intermediate position.
Figure 13:
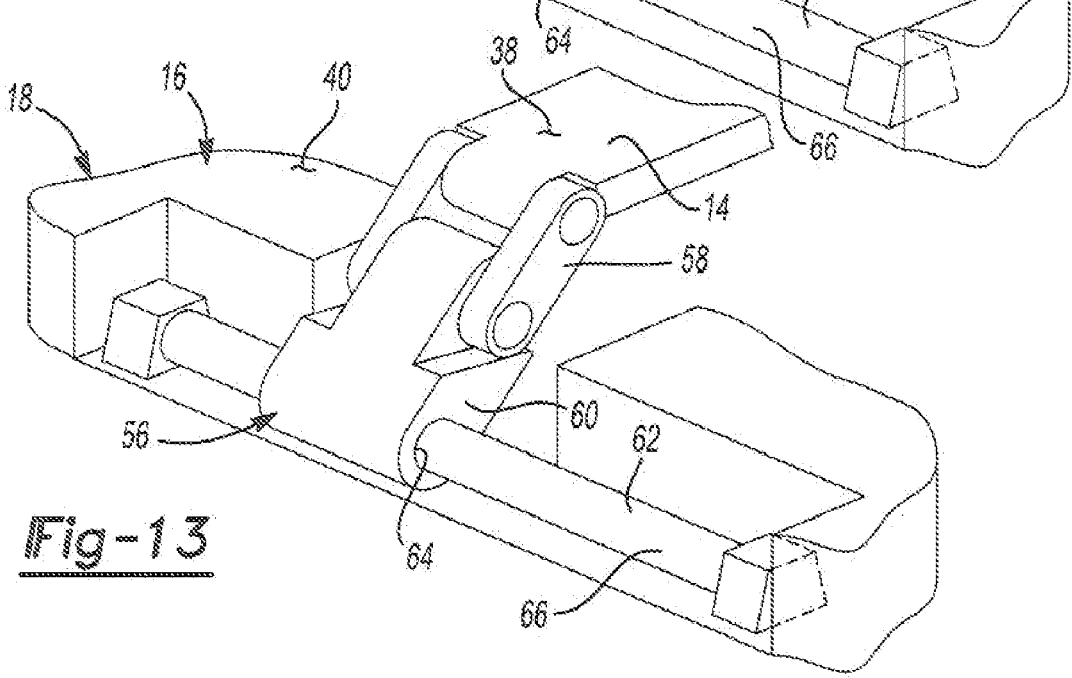
FIG. 13 is a partial perspective view of the roof-rack assembly of FIG. 10 with a cross-member in a use position.

With particular reference to FIGS. 11-13, operation of the roof-rack assembly 10c will be described in detail. When the cross-member 14 is in the stowed position (FIG. 11), the top surface 38 of the cross-member 14 is substantially flush with the surface 40 of the roof 16. A force may be applied generally to the cross-member 14 to move the cross-member 14 away from the recess 36 of the roof 16 and generally towards the use position. Application of the force to the cross-member 14 causes concurrent movement of the top link 58 and bottom link 60 relative to one another and relative to the roof 16. An intermediate position of the cross-member 14 (i.e., between the stowed position and the use position) is shown in FIG. 12. While movement of the cross-member 14 is described as causing concurrent movement of both the top link 58 and the bottom link 60, such force may only cause initial movement of the fop link 58 relative to the bottom link 60, as shown in FIG. 12.

Sufficient movement of the cross-member 14 relative to the roof 16 causes the cross-member 14 to be in a spaced-apart relationship relative to the surface 40 of the roof 16. Once the cross-member 14 is in the use position (FIG. 13), a locking mechanism (not shown) such as a mechanical fastener and/or temporary holding fastener such as, for example, a detent, may hold the cross-member 14 in the use position. In this position, the cross-member 14 may support objects in a spaced-apart relationship relative to the surface 40 of the vehicle roof 16.

Once the cross-member 14 is positioned in the use position (FIG. 13), a force may be applied generally to the cross-member 14 and/or linkage assembly 56 to move the linkage assembly 56 and cross-member 14 relative to the roof 16 in the fore-aft direction.

To return the cross-member 14 to the stowed position, a force may be applied generally to the cross-member 14 to move the cross-member 14 generally towards the roof 16. The force applied to the cross-member 14 to move the cross-member 14 generally towards the roof 16 can only be applied once the cross-member 14 is positioned generally in an opposed relationship relative to the recess 36. For example, if the cross-member 14 is in a position (i.e., a fore-aft position) relative to the recess 36, the cross-member 14 must first be positioned relative to the recess 36 such that the cross-member 14 opposes the recess 36 before a force may be applied to the cross-member 14 to move the cross-member 14 into the stowed position.

The force applied to the cross-member 14 to move the cross-member 14 towards the roof 16 must be sufficient to overcome any locking mechanism holding the cross-member 14 in the use position. Once a sufficient force is applied to the cross-member 14, the support member 14 will be received generally within the recess 36 such that the top surface 38 of the cross-member 14 is substantially flush with the surface 40 of the roof 16. As with the roof-rack assembly 10, positioning the cross-member 14 generally within the recess 36 such that the top surface 38 of the cross-member 14 is substantially flush with the surface 40 of the roof 16 improves the overall aerodynamics and fuel efficiency of the vehicle 18.

With particular reference to FIGS. 14-18, a roof-rack assembly 10d is provided and includes a front assembly 20d and a rear assembly 22d. In view of the substantial similarity in both structure and function of the roof-rack assembly 10d when compared to the roof-rack assembly 10, like reference numerals are used in the specification and drawings to identify like components while like reference numerals containing letter extensions are used to identify those components that have been modified.

Figure 14:
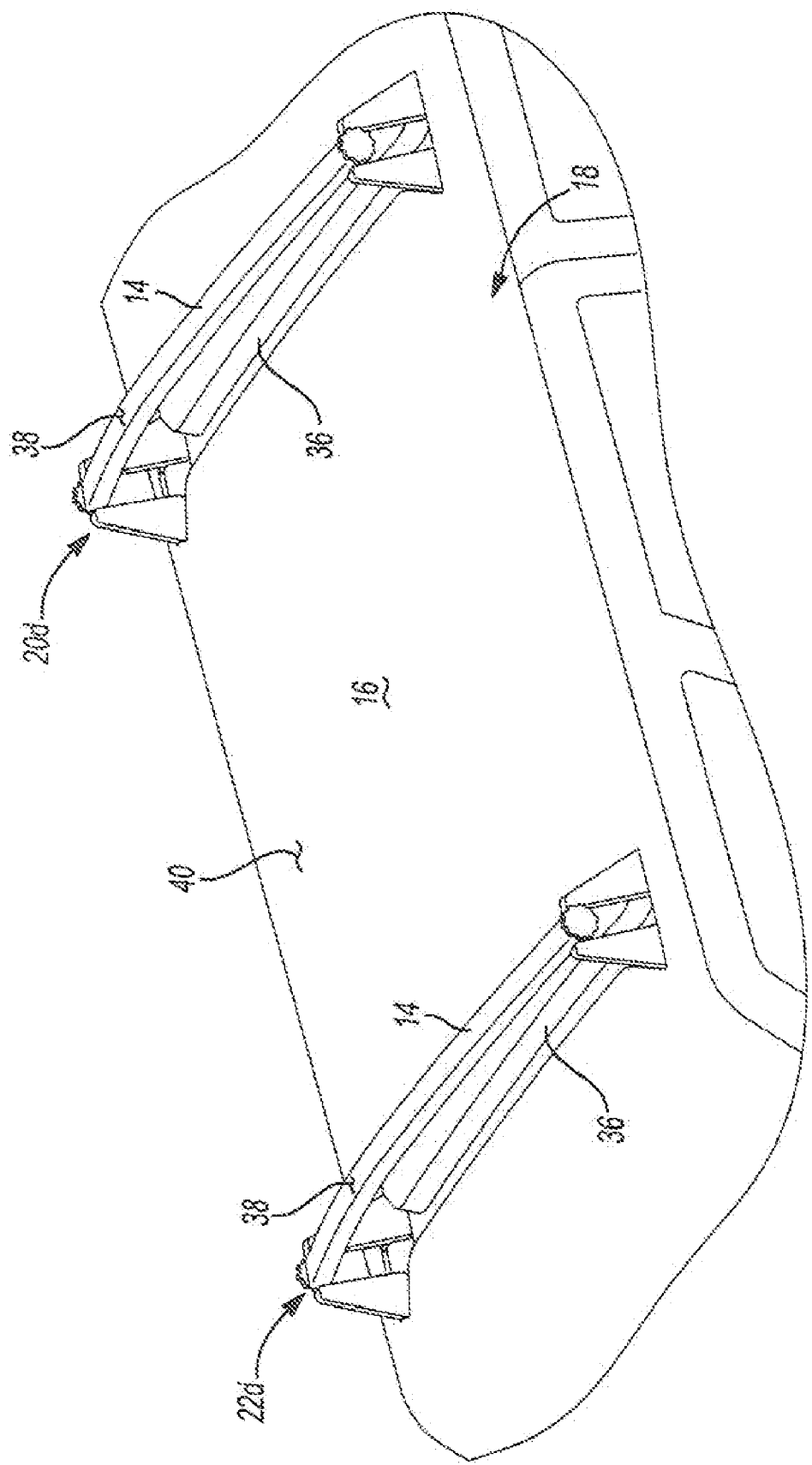
FIG. 14 is a partial perspective view of a vehicle incorporating a roof-rack system in accordance with the principles of the present invention.
Figure 15:
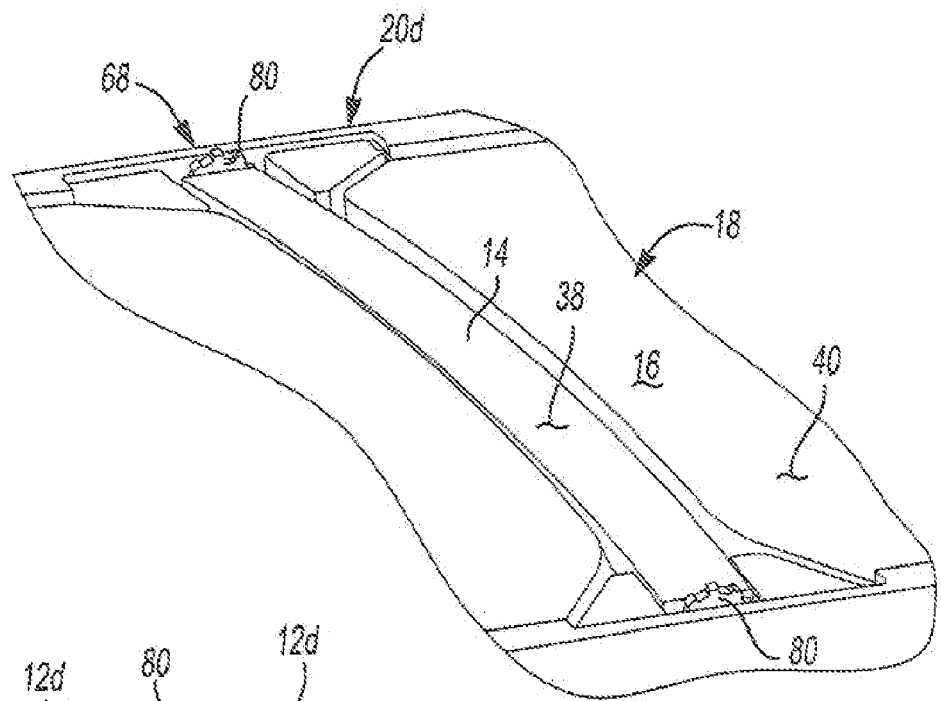
FIG. 15 is a partial perspective view of the roof-rack assembly of FIG. 14 with a cross-member shown in a stowed position.
Figure 16:
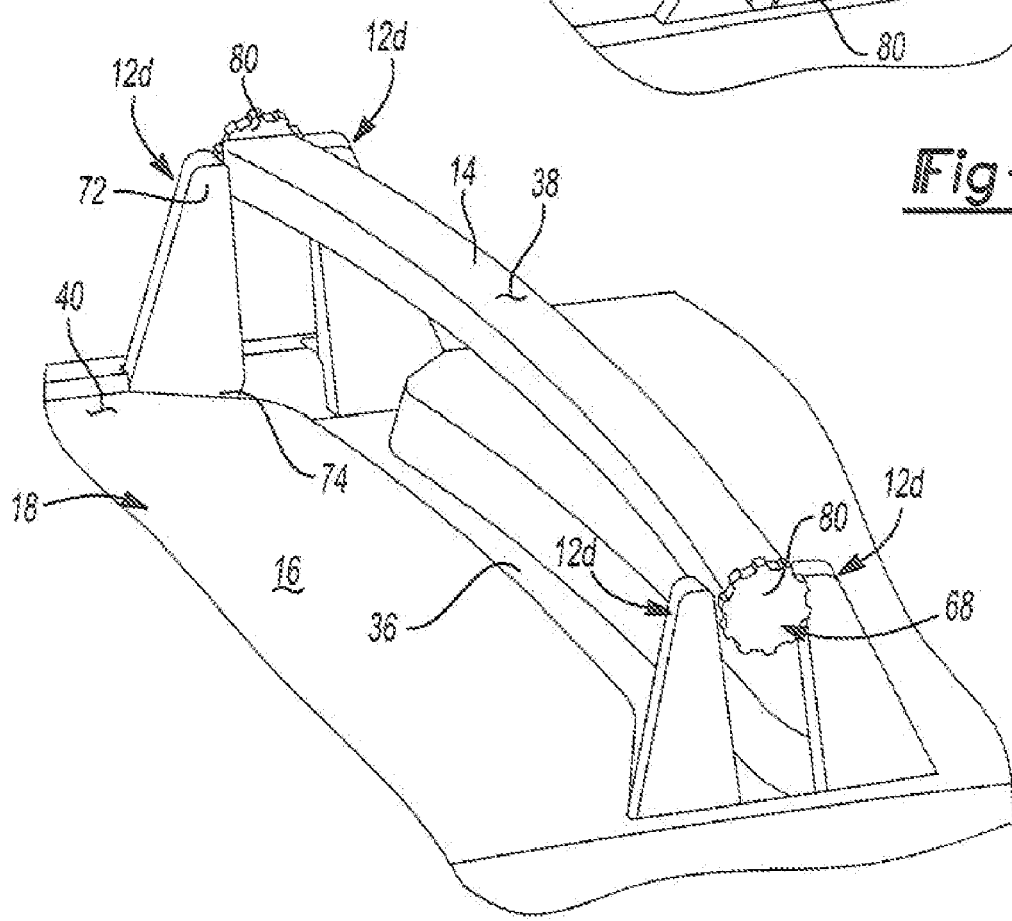
FIG. 16 is a partial perspective view of the roof-rack assembly of FIG. 14 with a cross-member shown in a use position.

As shown in FIG. 14, the rear assembly 22d is substantially identical to the front assembly 20d. Therefore, a detailed description of the components and operation of the rear assembly 22d is foregone.

The front assembly 20d includes a pair of support members and an adjustment mechanism 68. The adjustment mechanism 68 cooperates with the support members 12d to position the cross-member 14 in both the stowed position and the use position. Each support member 12d is pivotably attached to the roof 16 generally within the recess 36 at a pivot 70 and includes a first end 72 disposed generally proximate to a junction between the support member 12d and the cross-member 14 and a second end 74 disposed proximate to the pivot 70. The second end 74 may include an extension 76 that assists in stabilizing the cross-member 14 when the cross-member 14 is in the use position. Cooperation between the extension 76 of the respective support members 12d restricts cross-car (i.e., lateral) movement of the support members 12d and, thus, the cross-member 14 when the cross-member 14 is in the use position.

The adjustment mechanism 68 cooperates with the support members 12d to move the cross-member 14 between the use position and the stowed position. For example, the adjustment mechanism 68 may include a threaded cross-rod 78 that extends generally across a length of the cross-member 14 and an adjustment knob 80 fixed for rotation with the cross-rod 78.

Figure 17:
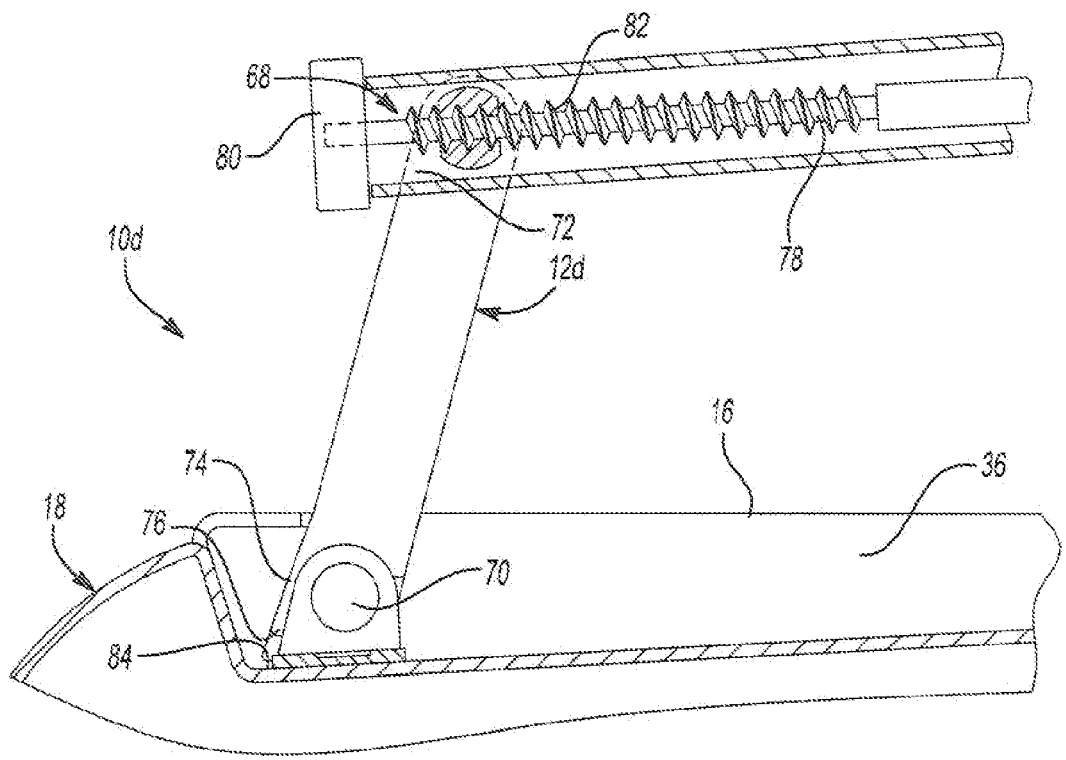
FIG. 17 is a partial cross sectional view of the roof-rack assembly of FIG. 14 with a cross-member shown in a use position.
Figure 18:
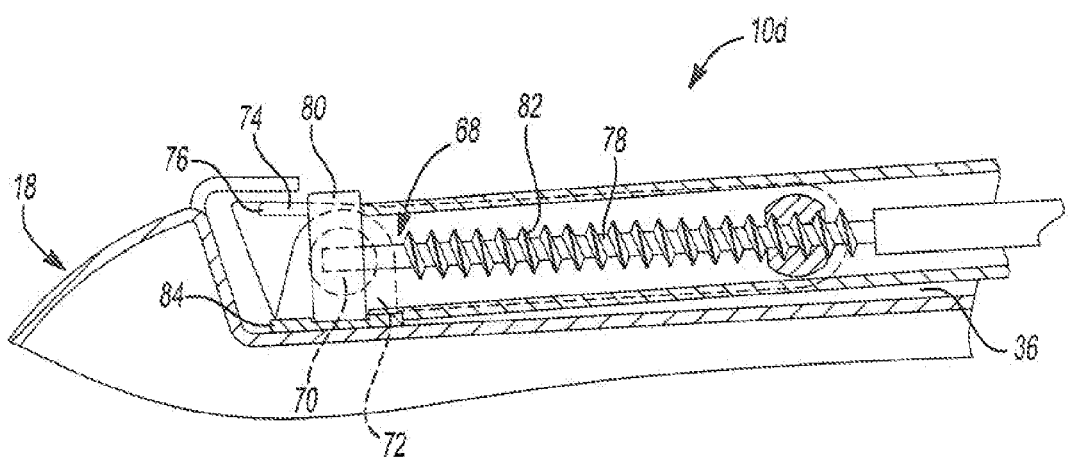
FIG. 18 is a partial cross sectional view of the roof-rack assembly of FIG. 14 with a cross-member shown in a stowed position.

With particular reference to FIGS. 17 and 18, operation of the roof-rack assembly 10d will be described in detail. When the cross-member 14 is in the use position (FIG. 17), engagement between teeth 82 of the cross-rod 78 and the first end 72 of the support members 12d prevents movement of the cross-member 14 from the use position to the stowed position. To move the cross-member 14 from the use position to the stowed position, a rotational force may be applied to the adjustment knob 80 to rotate the adjustment knob 80 relative to the cross-member 14.

Because the cross-rod 78 is fixedly attached to the adjustment knob 80, rotation of the adjustment knob 80 causes concurrent rotation of the cross-rod 78 and, thus, the teeth 82. Rotation of the cross-rod 78 and teeth 82 causes the teeth 82 to engage and move along the first end 72 of the support members 12d. Such relative movement between the cross-rod 78 and the first end 72 of the support members 12d causes the support members 12d to pivot about the first end 72 relative to the cross-member 14 and to pivot about the second end 74 about the pivot 70.

Sufficient rotation of the adjustment knob 80 causes the cross-member 14 to be in a position such that the support members 12d are substantially parallel to the roof 16 and disposed generally within the recess 36. Because the cross-member 14 is pivotally attached to the support members 12d, pivotable movement of the support members 12d relative to the roof 16, such that the support members 12d are received generally within the recess 36 formed in the roof 16, causes the cross-member 14 to similarly be received within the recess 36. Positioning the cross-member 14 within the recess 36 causes the top surface 38 of the cross-member 14 to be substantially flush with the surface 40 of the roof 16. As with the roof-rack assembly 10, positioning the top surface 38 of the cross-member 14 substantially flush with the surface 40 of the roof 16 improves the overall aerodynamics and fuel efficiency of the vehicle 18.

A force may be applied to the adjustment knob 80 to once again rotate the cross-rod 78 relative to the cross-member 14 to return the cross-member 14 to the use position. The rotatable force applied to the adjustment knob 80 to return the cross-member 14 to the use position is generally in an opposite direction to that applied to the adjustment knob 80 to move the cross-member 14 from the use position to the stowed position. Sufficient rotation of the adjustment knob 80 causes the teeth 82 of the cross-rod 78 to move along and engage the first end 72 of each support member 12d until the cross-member 14 has been sufficiently moved into the use position. When in the use position, engagement between the extension 76 of each support member 12d and a bottom surface 84 of the recess 36 prevents lateral movement of the support members 12d and cross-member 14 when the cross-member 14 is in the use position. In this position, the cross-member 14 may support objects in a spaced-apart relationship relative to the surface 40 of the roof 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof-rack assembly for a vehicle including a roof, the roof rack comprising:
  a first support member extending along a length of the roof and including a first end pivotably attached to the roof, said first support member pivotable about said first end between a use position and a stowed position;
  a second support member spaced apart from said first support member, extending along a length of the roof, and including a first end pivotably attached to the roof, said second support member pivotable about said first end of said second support member between a use position and a stowed position;
  at least one cross-member extending between and pivotably attached to said first support member and said second support member and movable between a use position and a stowed position relative to the roof in a direction substantially perpendicular to the roof, said first support member, said second support member, and said at least one cross-member extending away from a surface of the roof in said use positions and received within the roof in said stowed positions; and
  an adjustment knob configured such as, wherein rotation of said adjustment knob relative to said at least one cross-member moves said first support member, said second support member, and said at least one cross-member between said use positions and said stowed position.

2. The roof-rack assembly of claim 1, wherein said at least one cross-member is received within a channel formed in the roof when said at least one cross-member is in said stowed position.

3. The roof-rack assembly of claim 1, wherein a surface of said at least one cross-member is substantially flush with a surface of the roof when said at least one cross-member is in said stowed position.

4. The roof-rack assembly of claim 1, wherein said first support member and said second support member are substantially perpendicular to the roof in said use positions and are substantially parallel to the roof in said stowed positions.

5. The roof-rack assembly of claim 1, further comprising a locking mechanism disposed between a junction of said at least one cross-member and said first support member to selectively lock said at least one cross-member in said use position.

6. The roof-rack assembly of claim 1, further comprising an adjustment mechanism that selectively moves said at least one cross-member between said stowed position and said use position.

7. The roof-rack assembly of claim 6, wherein said adjustment mechanism is disposed within said at least one cross-member.

8. The roof-rack assembly of claim 6, wherein said adjustment mechanism is disposed at a junction of said at least one cross-member and said first support member and at a junction of said at least one cross-member and said second support member.

9. The roof-rack assembly of claim 1, further comprising a cross-rod including a series of teeth that engage said first support member and said second support member to move said first support member, said second support member, and said at least one cross-member between said use positions and said stowed positions.

10. A vehicle comprising:
a roof including an outer surface;
a first support member extending along a length of said roof and including a first end pivotably attached to said roof, said first support member pivotable about said first end between a use position and a stowed position;
a second support member spaced apart from said first support member, extending along a length of said roof, and including a first end pivotably attached to said roof, said second support member pivotable about said first end of said second support member between a use position and a stowed position;
at least one cross-member extending between and pivotably attached to said first support member and said second support member and movable relative to said roof between a stowed position and a use position in a direction substantially perpendicular to the roof, said first support member, said second support member and said at least one cross-member extending from said outer surface of said roof in said use positions and recessed from said outer surface of said roof in said stowed positions; and
an adjustment knob configured such as, wherein rotation of said adjustment knob relative to said at least one cross-member moves said first support member, said second support member, and said at least one cross-member between said use positions and said stowed position.

11. The vehicle of claim 10, wherein said roof includes at least one channel recessed from said outer surface, said at least one cross-member being received within said at least one channel when said at least one cross-member is in said stowed position.

12. The vehicle of claim 10, wherein a surface of said at least one cross-member is substantially flush with said outer surface of said roof when said at least one cross-member is in said stowed position.

13. The vehicle of claim 10, wherein said first support member and said second support member are substantially perpendicular to said roof in said use positions and are substantially parallel to said roof in said stowed positions.

14. The vehicle of claim 10, further comprising at least one locking mechanism disposed between a junction of said at least one cross-member and said first support member to selectively lock said at least one cross-member in said use position.

15. The vehicle of claim 10, further comprising an adjustment mechanism that selectively moves said at least one cross-member between said stowed position and said use position.

16. The vehicle of claim 15, wherein said adjustment mechanism is disposed within said at least one cross-member.

17. The vehicle of claim 15, wherein said adjustment mechanism is disposed at a junction of said at least one cross-member and said first support member and at a junction of said at least one cross-member and said second support member.

18. The vehicle of claim 10, further comprising a cross-rod including a series of teeth that engage said first support member and said second support member to move said first support member, said second support member, and said at least one cross-member between said use positions and said stowed positions.

* * * * *